(12) United States Patent
Kim

(10) Patent No.: US 12,415,487 B2
(45) Date of Patent: Sep. 16, 2025

(54) ELECTRO-MECHANICAL BRAKE SYSTEM AND CONTROL METHOD THEREOF

(71) Applicant: HL MANDO CORPORATION, Pyeongtaek (KR)

(72) Inventor: Seongnam Kim, Hwaseong (KR)

(73) Assignee: HL MANDO CORPORATION, Pyeongtaek (KR)

(*) Notice: Subject to any disclaimer, the term of this patent is extended or adjusted under 35 U.S.C. 154(b) by 108 days.

(21) Appl. No.: 18/542,636

(22) Filed: Dec. 16, 2023

(65) Prior Publication Data

US 2025/0033614 A1 Jan. 30, 2025

(30) Foreign Application Priority Data

Jul. 25, 2023 (KR) ........................ 10-2023-0096582

(51) Int. Cl.
| | |
|---|---|
| *B60T 8/17* | (2006.01) |
| *B60T 8/171* | (2006.01) |
| *B60T 8/172* | (2006.01) |
| *B60T 8/1761* | (2006.01) |
| *B60T 8/32* | (2006.01) |

(52) U.S. Cl.
CPC .......... *B60T 8/17616* (2013.01); *B60T 8/171* (2013.01); *B60T 8/172* (2013.01); *B60T 8/3255* (2013.01); *B60T 2220/04* (2013.01); *B60T 2240/02* (2013.01); *B60T 2250/04* (2013.01)

(58) Field of Classification Search
CPC ...... B60T 8/17616; B60T 8/171; B60T 8/172; B60T 8/3255; B60T 8/176; B60T 2220/04; B60T 2240/02; B60T 2250/04; B60T 13/746; B60T 2210/10; B60T 2270/10; B60Y 2400/3032; B60Y 2400/81
USPC .............................................. 701/70, 71, 82
See application file for complete search history.

(56) References Cited

FOREIGN PATENT DOCUMENTS

| | | | | |
|---|---|---|---|---|
| CA | 3116981 A1 * | 4/2020 | ............ | B60K 17/04 |
| KR | 10-2015-0026877 A | 3/2015 | | |
| KR | 10-2019-0090397 A | 8/2019 | | |
| KR | 10-2022-0102001 A | 7/2022 | | |

* cited by examiner

*Primary Examiner* — Hai H Huynh
(74) *Attorney, Agent, or Firm* — Harvest IP Law, LLP

(57) ABSTRACT

The disclosure relates to an electro-mechanical brake system including: an electro-mechanical brake configured to generate a braking force in each wheel according to a pedal effect applied to a brake pedal; a brake control unit configured to determine whether a wheel slip has occurred based on a wheel speed sensor values received from wheel speed sensors installed in wheels of a vehicle to set activation or deactivation of Anti-lock Braking System (ABS) control, and activate the ABS control on the electro-mechanical brake according to occurrence of a wheel slip, wherein the brake control unit is configured to obtain a first target wheel torque based on a wheel slip value and a road surface condition upon activation of the ABS control, and obtain a second target wheel torque by recalculating the first target wheel torque based on a communication delay and a mechanical response of the electro-mechanical brake.

20 Claims, 6 Drawing Sheets

ELECTRO-MECHANICAL BRAKE SYSTEM AND CONTROL METHOD THEREOF

CROSS-REFERENCE TO RELATED APPLICATION(S)

This application is based on and claims priority under 35 U.S.C. § 119 to Korean Patent Application No. 10-2023-0096582, filed on Jul. 25, 2023, in the Korean Intellectual Property Office, the disclosure of which is incorporated by reference herein in its entirety.

BACKGROUND

1. Field

The disclosure relates to an electro-mechanical brake system for performing Anti-lock Braking System (ABS) control in consideration of a response delay, and a control method thereof.

2. Description of the Related Art

In general, an Electro-Mechanical Brake (EMB) system is driven by the control of a Brake Control Unit (BCU). In some cases, the Electronic Control Unit (ECU) of a specific EMB functions as a BCU.

In an EMB system in which a BCU or ECU functions as a BCU, the BCU or ECU manages the overall braking function and provides a target wheel torque to each EMB. Thereby, the EMB performs torque feedback control such that a current wheel torque follows the target torque. In this process, communication between the BCU and the EMB is carried out through Controller Area Network (CAN), FlexRay, etc.

However, in the communication process, a signal delay may occur. Additionally, because the EMB motor uses a reducer with a large gear ratio for high torque output, a mechanical response delay may also occur. The delays may cause a decrease in braking efficiency or vehicle instability, especially in situations where rapid changes in wheel torque are required during the Anti-lock Braking System (ABS) control.

SUMMARY

It is an aspect of the disclosure to provide an electro-mechanical brake system capable of performing an Anti-lock Braking System (ABS) control strategy in consideration of a response delay, and a control method thereof.

Additional aspects of the disclosure will be set forth in part in the description which follows and, in part, will be obvious from the description, or may be learned by practice of the disclosure.

In accordance with an aspect of the disclosure, an electro-mechanical brake system may include an electro-mechanical brake configured to generate a braking force in each wheel according to a pedal effect applied to a brake pedal, a brake control unit configured to determine whether a wheel slip has occurred based on wheel speed sensor values received from wheel speed sensors installed in wheels of a vehicle to set activation or deactivation of Anti-lock Braking System (ABS) control, and activate the ABS control on the electro-mechanical brake according to occurrence of a wheel slip, wherein the brake control unit may be configured to obtain a first target wheel torque based on a wheel slip value and a road surface condition upon activation of the ABS control, and obtain a second target wheel torque by recalculating a target wheel torque based on the first target wheel torque, a communication delay, and a mechanical response of the electro-mechanical brake.

The brake control unit may obtain the wheel slip value based on wheel speed sensor values, determine whether a wheel slip has occurred based on the wheel slip value, and perform the ABS control on the electro-mechanical brake based on occurrence of the wheel slip.

The brake control unit may obtain the wheel slip value based on a value resulting from dividing a difference between wheel speed values by the vehicle speed.

The brake control unit is may determine, according to the wheel slip value being greater than a first threshold value, occurrence of a wheel slip to activate the ABS control, and deactivate the ABS control according to the wheel slip value maintained to be smaller than a second threshold value for a preset time.

The brake control unit may obtain the second target wheel torque by recalculating the target wheel torque in a pattern manner based on the first target wheel torque, a communication delay, and a mechanical response of the electro-mechanical brake.

The brake control unit may obtain the second target wheel torque by subtracting a reference torque decrease amount from the first target wheel torque based on a decrease of the first target wheel torque, and limit a magnitude of an increase amount of the second target wheel torque based on an increase of the first target wheel torque.

In an initial control loop of the ABS control, the first target wheel torque and the second target wheel torque may be identical to a required wheel torque from a driver or Advanced Driver Assistance Systems (ADAS).

The brake control unit may transmit a required wheel torque from a driver or Advanced Driver Assistance Systems (ADAS) to the electro-mechanical brake according to non-occurrence of a wheel slip.

The electro-mechanical brake may include an Electronic Control Unit (ECU) configured to perform torque feedback control based on the second target wheel torque or the required wheel torque.

In accordance with an aspect of the disclosure, a method for controlling an electro-mechanical brake system for generating a braking force in each wheel according to a pedal effort applied to a brake pedal may include determining whether a wheel slip has occurred based on wheel speed sensor values received from wheel speed sensors installed in wheels of a vehicle to set activation or deactivation of Anti-lock Braking System (ABS) control, and activating the ABS control on the electro-mechanical brake according to occurrence of a wheel slip, wherein the activating of the ABS control may further include obtaining a first target wheel torque based on a wheel slip value and a road surface condition, obtaining a second target wheel torque by recalculating a target wheel torque based on the first target wheel torque, a communication delay, and a mechanical response of the electro-mechanical brake, and performing torque feedback control based on the second target wheel torque.

The determining of whether the wheel slip has occurred to set the activation or deactivation of the ABS control may include obtaining the wheel slip value based on the wheel speed sensor value; comparing the wheel slip value with a first threshold value; and determining occurrence of a wheel slip according to the wheel slip value being greater than the first threshold value to activate the ABS control.

The method may further include performing torque feedback control based on the required wheel torque.

The obtaining of the second target wheel torque may include obtaining the second target wheel torque by recalculating the target wheel torque in a pattern manner based on the first target wheel torque, a communication delay, and a mechanical response of the electro-mechanical brake.

The obtaining of the second target wheel torque may further include initializing the wheel torque increase time according to a decrease of the first target wheel torque; and obtaining the second target wheel torque by subtracting a reference torque decrease amount from the first target wheel torque according to a second target wheel torque in a previous control loop being greater than the first target wheel torque.

In an initial control loop of the ABS control, the first target wheel torque and the second target wheel torque may be identical to a required wheel torque from a driver or Advanced Driver Assistance Systems (ADAS).

The method may further include setting the second target wheel torque in the previous control loop to the second target wheel torque according to the second target wheel torque in the previous control loop being not greater than the second target wheel torque.

The method may further include determining whether the wheel torque increase time has been initialized, according to the first target wheel torque not decreased; comparing, according to the wheel torque increase time initialized, the second target wheel torque in the previous control loop with a value resulting from subtracting the reference torque increase amount from the first target wheel torque; calculating, according to the second target wheel torque in the previous control loop being smaller than the value resulting from subtracting the reference torque increase amount from the first target wheel torque, a wheel torque increase time, and obtaining a delta torque as a torque amount to increase for each control loop; and obtaining the second target wheel torque by decreasing the wheel torque increase time and adding the delta torque to the second target wheel torque in the previous control loop.

The obtaining of the second target wheel torque may further include initializing the wheel torque increase time according to a decrease of the first target wheel torque; and obtaining the second target wheel torque by subtracting a reference torque decrease amount from the first target wheel torque according to a second target wheel torque in a previous control loop being greater than the first target wheel torque.

In an initial control loop of the ABS control, the first target wheel torque and the second target wheel torque may be identical to a required wheel torque from a driver or Advanced Driver Assistance Systems (ADAS).

The method may further include setting the second target wheel torque in the previous control loop to the second target wheel torque according to the second target wheel torque in the previous control loop being not greater than the second target wheel torque.

The method may further include determining whether the wheel torque increase time has been initialized, according to the first target wheel torque not decreased; comparing, according to the wheel torque increase time initialized, the second target wheel torque in the previous control loop with a value resulting from subtracting the reference torque increase amount from the first target wheel torque; calculating, according to the second target wheel torque in the previous control loop being smaller than the value resulting from subtracting the reference torque increase amount from the first target wheel torque, a wheel torque increase time, and obtaining a delta torque as a torque amount to increase for each control loop; and obtaining the second target wheel torque by decreasing the wheel torque increase time and adding the delta torque to the second target wheel torque in the previous control loop.

The method may further include decreasing, according to the wheel torque increase time not initialized, the wheel torque increase time, and adding the delta torque to the second target wheel torque in the previous control loop to obtain the second target wheel torque.

The method may further include setting the second target wheel torque in the previous control loop to the second target wheel torque, according to the second target wheel torque in the previous control loop being greater than the value resulting from subtracting the reference torque increase amount from the first target wheel torque.

BRIEF DESCRIPTION OF THE DRAWINGS

Reference will now be made in detail to the exemplary embodiments of the present disclosure, examples of which are illustrated in the accompanying drawings, wherein like reference numerals refer to like elements throughout.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

The expression, "at least one of a, b, and c," should be understood as including only a, only b, only c, both a and b, both a and c, both b and c, or all of a, b, and c.

Figure 1:
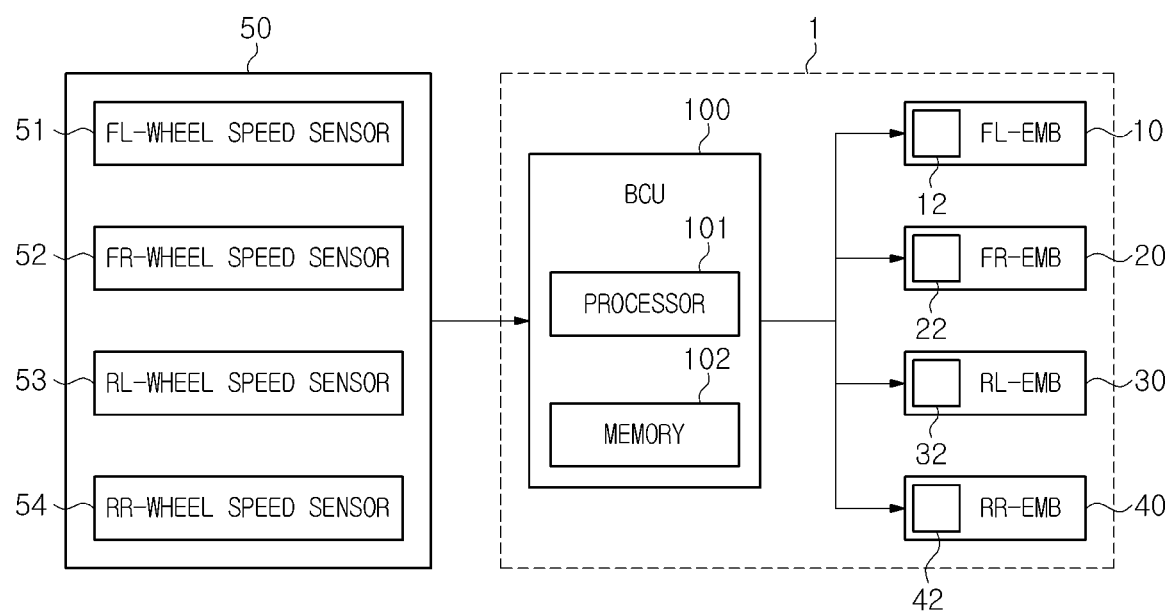
Figure 2:
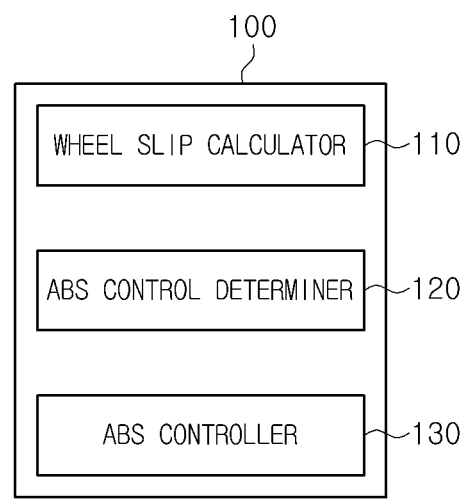
Figure 3:
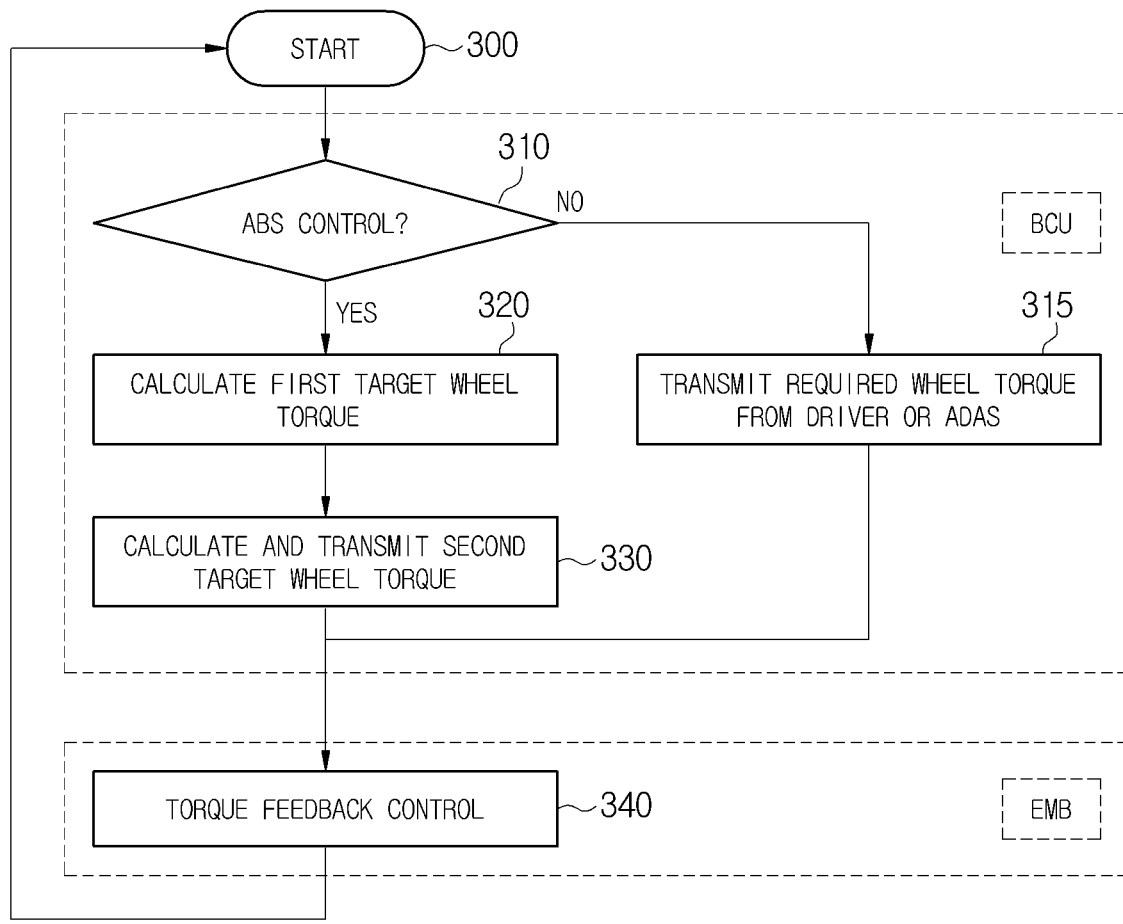
Figure 4:
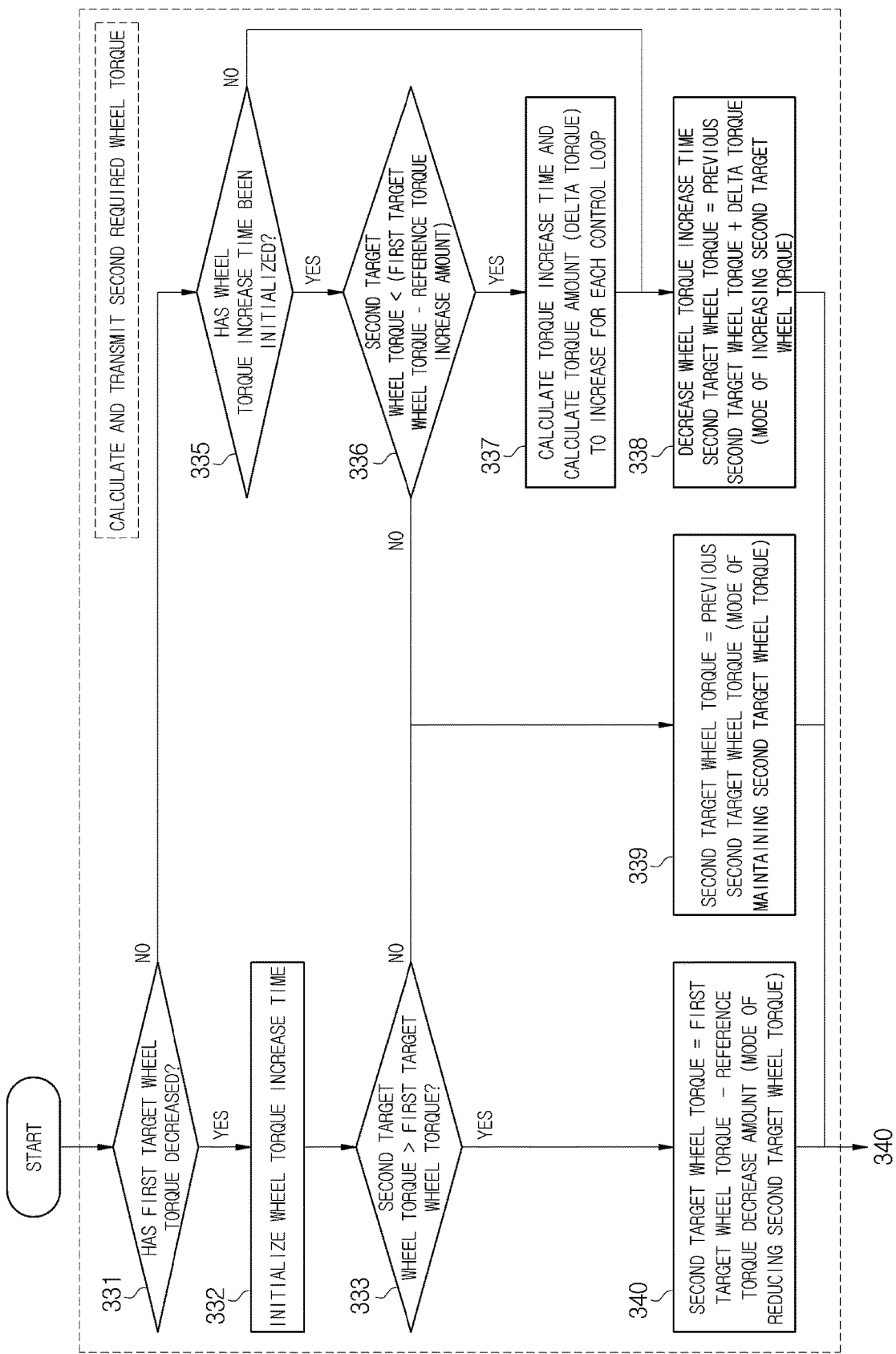
Figure 5:
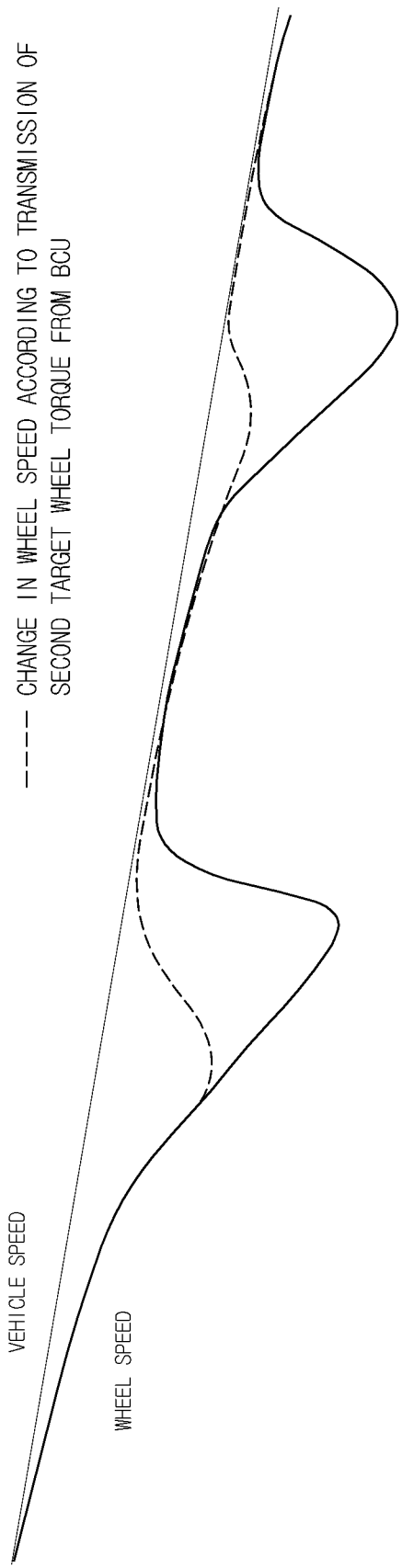
Figure 6:
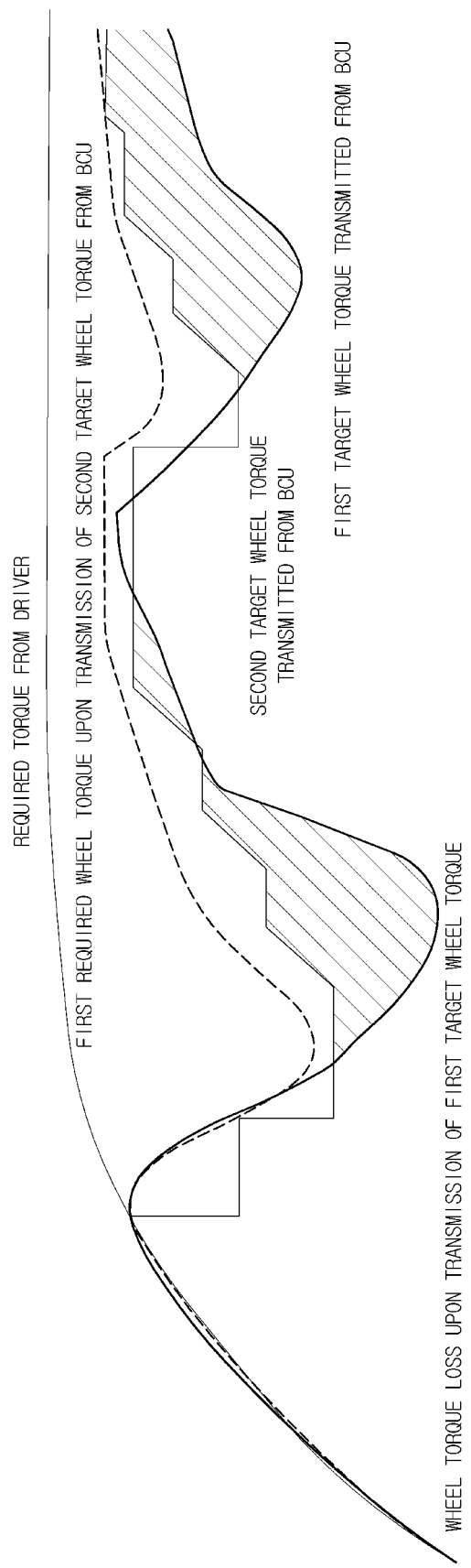

These and/or other aspects of the disclosure will become apparent and more readily appreciated from the following description of the embodiments, taken in conjunction with the accompanying drawings of which:

FIG. 1 schematically illustrates an electro-mechanical brake system according to an embodiment;

FIG. 2 illustrates a configuration of a Brake Control Unit (BCU) in an electro-mechanical brake system according to an embodiment;

FIG. 3 is a flowchart illustrating a method for controlling an electro-mechanical brake system according to an embodiment;

FIG. 4 is a flowchart illustrating a process of obtaining a second target wheel torque in a method for controlling an electro-mechanical brake system according to an embodiment;

FIG. 5 is a diagram illustrating changes in wheel speed according to a first target wheel torque and a second target wheel torque during activation of Anti-lock Braking System (ABS) control in an electro-mechanical brake system according to an embodiment; and FIG. 6 is a diagram illustrating a driver's required torque, a first target wheel torque, and a second target wheel torque over time during activation of ABS control in an electro-mechanical brake system according to an embodiment.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

The expression, "at least one of a, b, and c," should be understood as including only a, only b, only c, both a and b, both a and c, both b and c, or all of a, b, and c.

Reference will now be made in detail to the exemplary embodiments of the present disclosure, examples of which are illustrated in the accompanying drawings, wherein like reference numerals refer to like elements throughout.

In the following description, an 'electro-mechanical brake' according to the disclosure may be abbreviated to 'EMB', for convenience of description.

FIG. 1 schematically illustrates an electro-mechanical brake system according to an embodiment.

Referring to FIG. 1, an electro-mechanical brake system 1 according to an embodiment of the disclosure may be implemented with Electro-Mechanical Brakes (EMBs) 10, 20, 30, and 40 and a Brake Control Unit (BCU) 100.

The EMBs 10, 20, 30, and 40 may generate braking forces in wheels according to a pedal effort applied to a brake pedal.

To this end, the EMBs 10, 20, 30, and 40 may be installed in the respective wheels of a vehicle and include Electronic Control Units (ECUs) 12, 22, 32, and 42, respectively.

The EMBs 10, 20, 30, and 40 may receive a second target wheel torque transmitted from the BCU 100 which will be described below, upon Anti-lock Braking System (ABS) control, or a required wheel torque from a driver or Advanced Driver Assistance Systems (ADAS), and perform torque feedback control through the ECUs 12, 22, 32, and 42 based on the second target wheel torque or the required wheel torque.

The torque feedback control may calculate a braking torque that needs to be generated by a brake actuator based on the second target wheel torque or the required wheel torque.

The calculation may be performed by considering several factors, such as speed of the vehicle, a brake pad condition, a tire condition, etc.

The ECUs 12, 22, 32, and 42 may control the brake actuator according to the calculated braking torque.

The brake actuator may press the brake pad to a disc brake to generate a braking torque.

An actual braking torque that is generated in the electro-mechanical brake system 1 may be measured by a sensor and fed back to the ECUs 12, 22, 32, and 42.

The ECUs 12, 22, 32, and 42 may fine-tune actuator control by using a feedback and control the EMBs 10, 20, 30, and 40 such that the second target wheel torque or the required wheel torque is identical to the actual braking torque of the vehicle.

Also, the ECUs 12, 22, 32, and 42 may update the actuator control according to a change of a driving condition, such as speed of the vehicle or a road condition, thereby dynamically tuning the braking torque.

In this way, the ECUs 12, 22, 32, and 42 of the EMBs 10, 20, 30 and 40 may perform torque feedback control.

However, functions of the ECUs 12, 22, 32, and 42 of the EMBs 10, 20, 30 and 40 are not limited to these, and any one of the ECUs 12, 22, 32, and 42 of the EMBs 10, 20, 30 and 40 may function as the BCU 100 as necessary.

The BCU 100 and the EMBs 10, 20, 30 and 40 may transmit data or signals through a communication network for vehicle, such as Ethernet, Media Oriented Systems Transport (MOST), Flexray, Controller Area Network (CAN), Local Interconnect Network (LIN), etc.

In some cases, a signal delay may occur in the communication network for vehicle, and the signal delay may deteriorate accuracy of ABS control.

Also, an EMB motor may use a reducer with a large gear ratio for high torque output, and in this case, a mechanical response delay may occur, which may deteriorate accuracy of ABS control, like a signal delay.

The BCU 100 may determine whether a wheel slip has occurred, based on a wheel speed sensor value received from wheel speed sensors 51, 52, 53, and 54 installed in the respective wheels of the vehicle, to set activation or deactivation of ABS control, wherein upon occurrence of a wheel slip, the BCU 100 may activate ABS control on the EMBs 10, 20, 30 and 40.

Upon non-occurrence of a wheel slip, the BCU 100 may transmit the required wheel torque from the driver or ADAS to the EMBs 10, 20, 30, and 40.

The BCU 100 may be connected to the wheel speed sensors 51, 52, 53, and 54 installed in the respective wheels of the vehicle through the communication network for vehicle.

The BCU 100 may include a processor 101 and a memory 102.

The processor 101 may obtain a wheel slip value based on wheel speed and vehicle speed, determine whether a wheel slip has occurred based on the wheel slip value, and perform, according to activation of ABS control, ABS control on the EMBs 10, 20, 30, and 40. To this end, the processor 101 may calculate vehicle speed based on a wheel speed sensor value, and calculate deceleration/acceleration by differentiating the vehicle speed. That is, the processor 101 may obtain a value resulting from dividing a difference between wheel speed and vehicle speed by the vehicle speed, as the wheel slip value.

Also, the processor 101 may determine whether a wheel slip has occurred by comparing the wheel slip value with a first threshold value, to set activation of ABS control.

When the wheel slip value is maintained to be smaller than a second threshold value for a preset time, the processor 101 may set deactivation of ABS control.

During activation of ABS control, the processor 101 may perform ABS control on the EMBs 10, 20, 30, and 40. For example, the processor 101 may obtain a first target wheel torque according to a wheel slip value and a road surface condition, and recalculate the first target wheel torque based on a communication delay and a mechanical response of the EMBs 10, 20, 30, and 40 to obtain a second target wheel torque. The processor 101 may transmit the second target wheel torque to the ECUs 12, 22, 32, and 42 of the EMBs 10, 20, 30, and 40.

The processor 101 may include a signal processor for processing a wheel speed sensor value received from the wheel speed sensors 51, 52, 53, and 54, or a Micro Control Unit (MCU) for generating a braking/ABS control signal.

The memory 102 may store a program and/or data for processing brake control and ABS control. For example, the memory 102 may store or temporarily store data, such as the first threshold value, the second threshold value, a reference torque increase amount, a reference torque decrease amount, a wheel torque increase time, a delta torque, etc., to provide data for operation processing of the processor 101. Also, the memory 102 may store a program logic according to an algorithm for obtaining a first target wheel torque and a second target wheel torque.

The memory 102 may include a volatile memory, such as Static Random Access Memory (S-RAM) and Dynamic Random Access Memory (D-RAM), and a non-volatile memory, such as flash memory, Read Only Memory (ROM) and Erasable Programmable Read Only Memory (EPROM).

As described above, the BCU 100 may provide a braking signal upon normal braking or ABS braking by receiving and processing a wheel speed sensor value.

A method in which the BCU 100 performs ABS control in consideration of a response delay will be described in detail with reference to FIG. 2, below.

FIG. 2 illustrates a configuration of the BCU 100 in the electro-mechanical brake system 1 according to an embodiment.

The BCU 100 may include a wheel slip calculator 110, an ABS control determiner 120, and an ABS controller 130.

The wheel slip calculator 110 may obtain a wheel slip value based on wheel speed and vehicle speed.

For example, the wheel slip calculator 110 may obtain a value resulting from dividing a difference between wheel speed and vehicle speed by the vehicle speed, as a wheel slip value.

The ABS control determiner 120 may determine whether a wheel slip has occurred based on the obtained wheel slip value, and set activation or deactivation of ABS control according to the determined result.

For example, according to the obtained wheel slip value being greater than the first threshold value, the ABS control determiner 120 may determine occurrence of a wheel slip to activate ABS control.

Also, when a wheel slip value is maintained to be smaller than the second threshold value for a preset time during ABS control, the ABS control determiner 120 may deactivate the ABS control.

During activation of ABS control, the ABS controller 130 may perform ABS control on the EMBs 10, 20, 30, and 40.

For example, the ABS controller 130 may obtain a first target wheel torque according to a wheel slip value and a road surface condition, and recalculate the first target wheel torque based on a communication delay and a mechanical response of the EMBs 10, 20, 30, and 40 to obtain a second target wheel torque.

According to an embodiment, the ABS controller 130 may recalculate the first target wheel torque in a pattern manner to obtain the second target wheel torque, thereby causing the second target wheel torque to form a line graph over time.

For example, when the first target wheel torque has decreased from a first target wheel torque in a previous control loop, the ABS controller 130 may subtract a reference torque decrease amount from the first target wheel torque to obtain the second target wheel torque. Also, when the first target wheel torque has increased from the first target wheel torque in the previous control loop, the ABS controller 130 may recalculate the first target wheel torque to increase the second target wheel torque, while limiting a magnitude of a wheel torque increase amount.

In an initial control loop of ABS control, a first target wheel torque and a second target wheel torque may be set to a required wheel torque from the driver or ADAS.

Upon activation of ABS control, the ABS controller 130 may calculate a first target wheel torque based on a wheel slip value and a road surface condition. The ABS controller 130 may determine whether the first target wheel torque has decreased from a first target wheel torque in a previous control loop. When a second target wheel torque is obtained for the first time after activation of ABS control, a first target wheel torque in a previous control loop may be a required wheel torque in a state in which ABS control is deactivated, that is, a required wheel torque corresponding to a pedal effort applied to the brake pedal during normal driving in which no wheel slip occurs.

When the ABS controller 130 determines that the first target wheel torque has decreased from the first target wheel torque in the previous control loop, the ABS controller 130 may initialize a wheel torque increase time, and when a second target wheel torque in the previous control loop is greater than the first target wheel torque, the ABS controller 130 may subtract a preset reference torque decrease amount from the first target wheel torque to obtain a second target wheel torque. This may be a mode of decreasing a second target wheel torque, wherein the second target wheel torque is subtracted from a first target wheel torque by the reference torque decrease amount.

When the second target wheel torque in the previous control loop is not greater than the first target loop, the ABS controller 130 may obtain the second target wheel torque in the previous control loop as a second target wheel torque. This may be a mode of maintaining a second target wheel torque because the same target wheel torque as the second target wheel torque in the previous control loop is maintained.

In contrast, when the ABS controller 130 determines that the first target wheel torque has increased from the first target wheel torque in the previous control loop, the ABS controller 130 may determine whether a wheel torque increase time has been initialized, and when the ABS controller 130 determines that the wheel torque increase time has been initialized, the ABS controller 130 may compare the second target wheel torque in the previous control loop with a value resulting from subtracting the reference torque increase amount from the first target wheel torque. When the second target wheel torque in the previous control loop is smaller than the value resulting from subtracting the reference torque increase amount from the first target wheel torque, the ABS controller 130 may calculate a wheel torque increase time, and calculate a delta torque as a torque amount to increase for each control loop. The ABS controller 130 may decrease the calculated wheel torque increase time by a preset degree and add the delta torque to the second target wheel torque in the previous control loop, thereby obtaining a second target wheel torque. This may be a mode of increasing a second target wheel torque, wherein the second target wheel torque increases from the second target wheel torque in the previous control loop by the delta torque. Because the ABS controller 130 decreases the wheel torque increase time, the mode of increasing the second target wheel torque may have a shorter wheel torque maintenance time than the mode of decreasing the second target wheel torque. Thereby, a deep slip may be prevented.

When the second target wheel torque in the previous control loop is not smaller than the value resulting from subtracting the reference torque increase amount from the first target wheel torque, the ABS controller 130 may obtain the second target wheel torque in the previous control loop as a second target wheel torque. This may be a mode of maintaining a second target wheel torque because the same target wheel torque as the second target wheel torque in the previous control loop is maintained.

When the wheel torque increase time has not been initialized, this may mean the mode of increasing the second target wheel torque as in the previous control loop, and accordingly, the ABS controller 130 may obtain a second target wheel torque by adding the delta torque to the second target wheel torque in the previous control loop.

As such, the ABS controller 130 may obtain a second target wheel torque according to second target wheel torque patterns of three modes of a decrease mode, a maintenance mode, and an increase mode, based on first target wheel torques, second target wheel torques, wheel torque increase times, etc. in a current control loop and the previous control loop.

FIG. 3 is a flowchart illustrating a method for controlling an electro-mechanical brake system according to an embodiment, and FIG. 4 is a flowchart illustrating a process of obtaining a second target wheel torque in a method for controlling an electro-mechanical brake system according to an embodiment.

A method for controlling an electro-mechanical brake system according to an embodiment of the disclosure will be described in detail with reference to FIGS. 3 and 4.

Referring to FIG. 3, a method for controlling the electro-mechanical brake system 1 according to an embodiment of the disclosure may include operation 310 of determining whether a wheel slip has occurred based on a wheel speed sensor value received from the wheel speed sensors 51, 52, 53, and 54 installed in the respective wheels of the vehicle to set activation or deactivation of ABS control, and operation 320 to 340 of activating ABS control on the EMBs 10, 20, 30, and 40 according to occurrence of a wheel slip.

Operation 310 of determining whether a wheel slip has occurred to set activation or deactivation of ABS control may further include operation (not shown) of obtaining a wheel slip value based on a wheel speed sensor value, operation (not shown) of comparing the wheel slip value to a first threshold value, and operation 320 to 340 of determining that a wheel slip has occurred according to the wheel slip value being greater than the first threshold value to activate ABS control.

Operation 320 to 340 of activating the ABS control may further include operation 320 of calculating a first target wheel torque based on the wheel slip value and a road surface condition, operation 330 of recalculating the first target wheel torque based on a communication delay and a mechanical response of the EMBs 10, 20, 30, and 40 to obtain a second target wheel torque, and operation 340 of perform torque feedback control based on the second target wheel torque.

According to an embodiment, operation 315 of determining non-occurrence of a wheel slip according to the wheel slip value being not greater than the first threshold value and transmitting a required wheel torque from a driver or ADAS to the EMBs 10, 20, 30, and 40 may be further performed.

Operation 330 of obtaining the second target wheel torque may recalculate the first target wheel torque in a pattern manner to obtain the second target wheel torque, thereby forming the second target wheel torque in a form of a line graph over time, as shown in FIG. 6.

Three modes of a mode of decreasing a second target wheel torque, a mode of maintaining a second target wheel torque, and a mode of increasing a second target wheel torque may be divided based on first target wheel torques, second target wheel torques, and wheel torque increase times, etc. in a current control loop and the previous control loop.

Referring to FIG. 4, in an initial control loop of ABS control, a first target wheel torque and a second target wheel torque may be set to the required wheel torque from the driver or ADAS.

More specifically, referring to FIG. 4, operation 330 of obtaining a second target wheel torque may further include operation 331 of determining whether a first target wheel torque has decreased from a first target wheel torque in a previous control loop, operation 332 of initializing a wheel torque increase time according to the first target wheel torque decreased from the first target wheel torque in the previous control loop, operation 333 of determining whether a second target wheel torque in the previous control loop is greater than the first target wheel torque, and operation 334 of subtracting a reference torque decrease amount from the first target wheel torque according to the second target wheel torque in the previous control loop being greater than the first target wheel torque to obtain the second target wheel torque.

When a second target wheel torque is obtained for the first time after activation of ABS control, a first target wheel torque in a previous control loop may be a required wheel torque in a state in which ABS control is deactivated, that is, a required wheel torque corresponding to a pedal effort applied to the brake pedal during normal driving in which no wheel slip occurs.

A reason of initializing the wheel torque increase time in operation 332 of initializing the wheel torque increase time according to the decreased first target wheel torque may be because there is no need to limit a torque amount to decrease, unlike the increased first target wheel torque. In contrast, when the first target wheel torque has not decreased, whether the wheel torque increase time has been initialized may be determined, and a wheel torque increase time may be calculated. Details about this will be described below.

Operation 334 of subtracting the reference torque decrease amount from the first target wheel torque according to the second target wheel torque in the previous control loop being greater than the first target wheel torque to obtain the second target wheel torque may be the mode of decreasing the second target wheel torque, wherein the second target wheel torque is obtained by subtracting the reference torque decrease amount from the first target wheel torque.

According to an embodiment, operation 339 of setting the second target wheel torque in the previous control loop to the second target wheel torque according to the second target wheel torque in the previous control loop being not greater than the first target wheel torque may be further performed. In this case, because the second target wheel torque is identical to the second target wheel torque in the previous control loop, this state may be defined as the mode of maintaining the second target wheel torque.

According to an embodiment, when it is determined that the first target wheel torque has not decreased after operation 331 of determining whether the first target wheel torque has not decreased from the first target wheel torque in the previous control loop, operation 335 of determining whether the wheel torque increase time has been initialized, operation 336 of comparing, when it is determined that the wheel torque increase time has been initialized, a second target wheel torque in the previous control loop with a value resulting from subtracting the reference torque increase amount from the first target wheel torque, operation 337 of calculating a wheel torque increase time and calculating a delta torque as a torque amount to increase for each control loop according to the second target wheel torque in the previous control loop being smaller than the value resulting from subtracting the reference torque increase amount from the first target wheel torque, and operation 338 of decreasing the wheel torque increase time and adding the delta torque to the second target wheel torque in the previous control loop to obtain the second target wheel torque may be further performed.

A reason of comparing the second target wheel torque in the previous control loop with the value resulting from subtracting the reference torque increase amount from the first target wheel torque may be because, when the second target wheel torque in the previous control loop is greater than or equal to the value resulting from subtracting the reference torque increase amount from the first target wheel torque, there is no need to increase the second target wheel torque in the current control loop compared to the second target wheel torque in the previous control loop. Accordingly, in this case, the mode of maintaining the second target wheel torque to set the second target wheel torque in the previous control loop to the second target wheel torque may be performed.

In operation 337 of calculating a wheel torque increase time and calculating a delta torque as a torque amount to increase for each control loop according to the second target wheel torque in the previous control loop being smaller than the value resulting from subtracting the reference torque increase amount from the first target wheel torque, the wheel torque increase time may need to be calculated because the wheel torque increase time has been initialized in operation 332. Also, the delta torque as the torque amount to increase for each control loop may be calculated. At this time, the delta torque may need to be calculated by considering prevention of a deep slip.

In operation 338 of decreasing the wheel torque increase time and adding the delta torque to the second target wheel torque in the previous control loop to obtain the second target wheel torque, a reason of decreasing the wheel torque increase time may be to prevent a deep slip that may occur when the second target wheel torque increases for a too long time.

In operation 335 of determining whether the wheel torque increase time has been initialized when the first target wheel torque has not decreased, when the wheel torque increase time has not been initialized, the process may proceed to operation 338 of decreasing the wheel torque increase time and adding the delta torque to the second target wheel torque in the previous control loop to obtain the second target wheel torque. That the wheel torque increase time has not been initialized may mean a fact that the previous control loop has not been in the mode of decreasing the second target wheel torque. That is, because the previous control loop has been in the mode of maintaining the second target wheel torque or the mode of increasing the second target wheel torque, the second target wheel torque may be obtained by adding a previously calculated delta torque to the first target wheel torque without having to recalculate a delta torque.

According to an embodiment, operation 339 of setting, when the second target wheel torque in the previous control loop is greater than or equal to the value resulting from subtracting the reference torque increase amount from the first target wheel torque, the second target wheel torque in the previous control loop to the second target wheel torque may be further performed.

FIG. 5 is a diagram illustrating changes in wheel speed according to a first target wheel torque and a second target wheel torque during activation of ABS control in an electromechanical brake system according to an embodiment, and FIG. 6 is a diagram illustrating a driver's required torque, a first target wheel torque, and a second target wheel torque over time during activation of ABS control in an electromechanical brake system according to an embodiment.

Referring to FIGS. 5 and 6, it is seen that, when ABS control is activated according to occurrence of a wheel slip, a wheel speed change by a second target wheel torque and a change of the second target wheel torque have a smaller deviation from vehicle speed or a driver's required torque than a wheel speed change by a first target wheel torque and a change of the first target wheel torque.

It is seen in FIG. 6 that the second target wheel torque forms a line graph over time, unlike the first target wheel torque. That is, the second target wheel torque may be maintained constant for a preset time (a control loop), increase or decrease linearly for a control loop, or show a quantized change between control loops.

Also, as shown in FIG. 6, by applying the second target wheel torque, wheel torque amount loss that is expected when the first target wheel torque is applied as it is may be prevented, thereby improving fuel efficiency.

As such, according to the electro-mechanical brake system 1 for transmitting a second target wheel torque in consideration of a communication delay and a mechanical response delay with respect to a first target wheel torque upon activation of ABS control, and the control method thereof, it may be possible to prevent a deep slip during ABS operation and thereby improve a braking force and vehicle stability.

According to an aspect of the disclosure, the electro-mechanical brake system capable of transmitting a target torque in consideration of a communication delay and a mechanical response delay and the control method thereof are provided.

Therefore, by preventing a deep slip during ABS operation, a braking force and vehicle stability may be improved.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. An electro-mechanical brake system comprising:
an electro-mechanical brake configured to generate a braking force in each wheel according to a pedal effect applied to a brake pedal;
a brake control unit configured to determine whether a wheel slip has occurred based on wheel speed sensor values received from wheel speed sensors installed in wheels of a vehicle to set activation or deactivation of Anti-lock Braking System (ABS) control, and activate the ABS control on the electro-mechanical brake according to occurrence of a wheel slip,
wherein the brake control unit is configured to:
obtain a first target wheel torque based on a wheel slip value and a road surface condition upon activation of the ABS control, and
obtain a second target wheel torque by recalculating a target wheel torque based on the first target wheel torque, a communication delay, and a mechanical response of the electro-mechanical brake.

2. The electro-mechanical brake system of claim 1, wherein the brake control unit is further configured to:
obtain the wheel slip value based on wheel speed sensor values,
determine whether a wheel slip has occurred based on the wheel slip value, and
perform the ABS control on the electro-mechanical brake based on occurrence of the wheel slip.

3. The electro-mechanical brake system of claim 2, wherein the brake control unit is further configured to obtain the wheel slip value based on a value resulting from dividing a difference between wheel speed values by the vehicle speed.

4. The electro-mechanical brake system of claim 2, wherein the brake control unit is further configured to:
determine, according to the wheel slip value being greater than a first threshold value, occurrence of a wheel slip to activate the ABS control, and
deactivate the ABS control according to the wheel slip value maintained to be smaller than a second threshold value for a preset time.

5. The electro-mechanical brake system of claim 1, wherein the brake control unit is further configured to obtain the second target wheel torque by recalculating the target wheel torque in a pattern manner based on the first target wheel torque, a communication delay, and a mechanical response of the electro-mechanical brake.

6. The electro-mechanical brake system of claim 5, wherein the brake control unit is further configured to:
obtain the second target wheel torque by subtracting a reference torque decrease amount from the first target wheel torque based on a decrease of the first target wheel torque, and
limit a magnitude of an increase amount of the second target wheel torque based on an increase of the first target wheel torque.

7. The electro-mechanical brake system of claim 6, wherein in an initial control loop of the ABS control, the first target wheel torque and the second target wheel torque are identical to a required wheel torque from a driver or Advanced Driver Assistance Systems (ADAS).

8. The electro-mechanical brake system of claim 1, wherein the brake control unit is further configured to transmit a required wheel torque from a driver or Advanced Driver Assistance Systems (ADAS) to the electro-mechanical brake according to non-occurrence of a wheel slip.

9. The electro-mechanical brake system of claim 1, wherein the electro-mechanical brake includes an Electronic Control Unit (ECU) configured to perform torque feedback control based on the second target wheel torque or the required wheel torque.

10. A method for controlling an electro-mechanical brake system for generating a braking force in each wheel according to a pedal effort applied to a brake pedal, comprising:
   determining whether a wheel slip has occurred based on wheel speed sensor values received from wheel speed sensors installed in wheels of a vehicle to set activation or deactivation of Anti-lock Braking System (ABS) control; and
   activating the ABS control on the electro-mechanical brake according to occurrence of a wheel slip,
   wherein the activating of the ABS control further comprises:
      obtaining a first target wheel torque based on a wheel slip value and a road surface condition;
      obtaining a second target wheel torque by recalculating a target wheel torque based on the first target wheel torque, a communication delay, and a mechanical response of the electro-mechanical brake; and
      performing torque feedback control based on the second target wheel torque.

11. The method of claim 10, wherein the determining of whether the wheel slip has occurred to set the activation or deactivation of the ABS control comprises:
   obtaining the wheel slip value based on the wheel speed sensor value;
   comparing the wheel slip value with a first threshold value; and
   determining occurrence of a wheel slip according to the wheel slip value being greater than the first threshold value to activate the ABS control.

12. The method of claim 11, further comprising:
   determining non-occurrence of a wheel slip according to the wheel slip value being not greater than the first threshold value and
   transmitting a required wheel torque from a driver or Advanced Driver Assistance Systems (ADAS) to the electro-mechanical brake.

13. The method of claim 12, further comprising performing torque feedback control based on the required wheel torque.

14. The method of claim 10, wherein the obtaining of the second target wheel torque comprises obtaining the second target wheel torque by recalculating the target wheel torque in a pattern manner based on the first target wheel torque, a communication delay, and a mechanical response of the electro-mechanical brake.

15. The method of claim 14, wherein the obtaining of the second target wheel torque further comprises:
   initializing the wheel torque increase time according to a decrease of the first target wheel torque; and
   obtaining the second target wheel torque by subtracting a reference torque decrease amount from the first target wheel torque according to a second target wheel torque in a previous control loop being greater than the first target wheel torque.

16. The method of claim 15, wherein, in an initial control loop of the ABS control, the first target wheel torque and the second target wheel torque are identical to a required wheel torque from a driver or Advanced Driver Assistance Systems (ADAS).

17. The method of claim 15, further comprising setting the second target wheel torque in the previous control loop to the second target wheel torque according to the second target wheel torque in the previous control loop being not greater than the second target wheel torque.

18. The method of claim 15, further comprising:
   determining whether the wheel torque increase time has been initialized, according to the first target wheel torque not decreased;
   comparing, according to the wheel torque increase time initialized, the second target wheel torque in the previous control loop with a value resulting from subtracting the reference torque increase amount from the first target wheel torque;
   calculating, according to the second target wheel torque in the previous control loop being smaller than the value resulting from subtracting the reference torque increase amount from the first target wheel torque, a wheel torque increase time, and obtaining a delta torque as a torque amount to increase for each control loop; and
   obtaining the second target wheel torque by decreasing the wheel torque increase time and adding the delta torque to the second target wheel torque in the previous control loop.

19. The method of claim 18, further comprising decreasing, according to the wheel torque increase time not initialized, the wheel torque increase time, and adding the delta torque to the second target wheel torque in the previous control loop to obtain the second target wheel torque.

20. The method of claim 18, further comprising setting the second target wheel torque in the previous control loop to the second target wheel torque, according to the second target wheel torque in the previous control loop being greater than the value resulting from subtracting the reference torque increase amount from the first target wheel torque.

* * * * *